(12) United States Patent
Brun et al.

(10) Patent No.: US 6,833,570 B1
(45) Date of Patent: Dec. 21, 2004

(54) STRUCTURE COMPRISING AN INSULATED PART IN A SOLID SUBSTRATE AND METHOD FOR PRODUCING SAME

(76) Inventors: Jean Brun, 13 domaine de Ruchagnon, 38800 Champagnier (FR); Fabrice Vincent, 89 rue Bossuet, 69006 Lyon (FR); Jean-Sébastien Danel, 7, chemia de Gordes, 38100 - Grenoble (FR); Henri Blanc, La Colombiere, 38134 Saint Julien de Ratz (FR)

( * ) Notice: Subject to any disclaimer, the term of this patent is extended or adjusted under 35 U.S.C. 154(b) by 854 days.

(21) Appl. No.: 09/068,999
(22) PCT Filed: Oct. 1, 1997
(86) PCT No.: PCT/FR97/01734
§ 371 (c)(1),
(2), (4) Date: Jun. 30, 1998
(87) PCT Pub. No.: WO98/14787
PCT Pub. Date: Apr. 9, 1998

(30) Foreign Application Priority Data

Oct. 3, 1996 (FR) .............................. 96 12061

(51) Int. Cl.[7] .............................................. H01L 31/08
(52) U.S. Cl. ...................... 257/254; 428/620; 148/33.3; 438/52; 438/53
(58) Field of Search ........................... 257/254; 438/52, 438/53; 428/620; 148/33.3

(56) References Cited

U.S. PATENT DOCUMENTS

| 3,254,276 A | * | 5/1966 | Schwarz et al. |
| 3,634,787 A | * | 1/1972 | Newell |
| 3,990,927 A | * | 11/1976 | Montier |
| 5,352,635 A | * | 10/1994 | Tu et al. |
| 5,413,955 A | * | 5/1995 | Lee et al. |
| 5,545,594 A | * | 8/1996 | Cahill |
| 5,576,250 A | | 11/1996 | Diem et al. |
| 5,607,875 A | * | 3/1997 | Nishizawa et al. |
| 5,869,876 A | * | 2/1999 | Ishio et al. |

FOREIGN PATENT DOCUMENTS

| DE | 37 41 036 | 6/1989 |
| FR | 2 700 065 | 7/1994 |
| WO | WO 89/05459 | 6/1989 |
| WO | WO 96/07107 | 3/1996 |

OTHER PUBLICATIONS

Jonathan Campbell, Electronics World & Wireless World, vol. 100, No. 1704, p. 892, "Buried Technology Widens Market For ICDS", Nov. 1, 1994.

W. Menz, et al., Institute of Electrical And Electronics Engineers, pp. 69–73, 1991, "The Liga Technique —A Novel Concept For Microstructures and the Combination with SI–Technologies by Injection Molding", Jan. 30–Feb. 2.

Y. Matsumoto, et al., Sensors and Actuators A, vol. A39, No. 3, pp. 209–217, "Integrated Silicon Capacitive accelerometer with PLL Servo Technique", Dec. 1, 1993.

Gwiy–Sang Chung, et al., IEEE, pp. 676–680, "Novel High–Performance Pressure Sensors Using double SOI Structures", 1991.

John H. Comtois, et al., SPIE, vol. 2642, pp. 10–21, "Thermal Microactuators for Surface–Micromachining Processes".

V.P. Jaecklin, et al., Sensors and Actuators A, vol. 39, pp. 83–89, "Comb Actuators for XY–Microstages", 1993.

* cited by examiner

Primary Examiner—George Fourson
Assistant Examiner—Joannie Adelle Garcia
(74) Attorney, Agent, or Firm—Oblon, Spivak, McClelland, Maier & Neustadt, P.C.

(57) ABSTRACT

A structure having a first part and at least one second part. The second part is electrically insulated from the first part and the parts are formed in the same wafer of a material. The first and second parts have the same thickness, extend in the same plane and have at least one mutually adjacent edge. The adjacent edges are separated by a spacing. In addition there is at least one joint of insulating material arranged in the spacing to make the first and second parts integral. The structure may be used for sensors and isolated circuits.

7 Claims, 4 Drawing Sheets

STRUCTURE COMPRISING AN INSULATED PART IN A SOLID SUBSTRATE AND METHOD FOR PRODUCING SAME

BACKGROUND OF THE INVENTION

The invention relates to a structure including an insulating part in a massive substrate and a method of producing such a structure.

Such structures find applications in the field of microelectronics for the manufacture of integrated circuits, certain parts of which must be insulated and free from parasitic effects such as parasitic capacitive effects.

The structures also find applications in the field of micromechanics for the production of sensors such as accelerometers or pressure sensors, as well as the creation of actuators. In the case of an accelerometer, the insulated part of the structure is, for example, constituted by a seismic mass for measuring accelerations.

DISCUSSION OF THE BACKGROUND

For the production of sensors such as pressure sensors or accelerometers, widespread use is made of SOI type structures. These structures comprise a thin surface layer of silicon separated from an underlying layer of silicon by an embedded silicon oxide layer. The thin layer of silicon is locally freed from the underlying layer. It can then constitute, for example, the membrane of a pressure sensor or, when it is suitably formed, the seismic mass of an accelerometer. Reference may be made to this subject in documents (1) and (2), the references for which are given at the end of this description.

The surface layer can also be formed in such a way that an actuator is produced. Actuators produced according to micro-machining methods are described in documents (3) and (4), the references for which are also given at the end of this description.

The embedded oxide layer has the role of supporting the structure formed in the thin surface layer. This aspect is apparent in particular, in document (2) relating to an accelerometer.

However, because of its small thickness, the electrical or mechanical insulation provided by the insulatinq oxide layer can prove to be insufficient.

In particular, parasitic capacitance phenomena can be induced between the deep underlying layer of silicon and the surface layer of silicon.

These phenomena can affect, in a negative way, the measurements of an accelerometer or those of another sensor that operates according to a capacity measurement principle.

Another disadvantage of SOI type structures and of devices produced from these structures is associated with their cost.

SUMMARY OF THE INVENTION

The aim of this invention is to provide a structure with an electrically insulating part, the production of which is not expensive and which does not have the limitations mentioned above.

Another aim is also to provide a structure with an insulating part which is nearly not subject to parasitic capacity effects, and can be used for the production of a sensor. An aim of the invention is also to provide a method of producing such a structure.

In order to achieve these aims mentioned above, the invention has the more precise objective of a structure comprising a first part and at least one second part, electrically insulated from the first part, the first and second parts each being formed in the same wafer of material, said first and second parts each having substantially one and the same thickness, extending substantially in one and the same plane, and having at least one mutually adjacent edge, and, the adjacent edges of the first and second parts being separated by a spacing. Conforming to the invention, the structure comprises, in addition, at least one joint of insulating material, arranged in the spacing, to make the first and second parts integral, the joint being in mechanical contact with at least a portion of each wafer and extending substantially over the entire thickness of the wafers.

The joint of insulating material has a double function. The first function is to provide electrical insulation between the first and second parts. It should be noted that the quality of the electrical insulation can be adapted by making use of the width of the spacing, and hence the width of the joint, as well as the material used to form the joint. A second function of the insulating joint is to maintain the cohesion of the structure by making the first and second parts integral. In particular, the joint allows the wafers to be held with their principal faces substantially in one and the same plane.

Although the structure thus obtained can be linked to a suitable support structure, the second insulated part can be sufficiently far from the support or separated from the first part to prevent capacitive effects, if these are not desired.

On the other hand, in other applications, the adjacent edges of the first and second parts can be configured in such a way and arranged sufficiently close that a variable capacity is formed.

The measurement of this capacity and of its variations then allows the determination of any possible displacement between the first and second parts. This aspect, that permits the production of an accelerometer or an actuator, is described in greater detail in a subsequent part of the description.

According to one advantageous aspect, the first and second parts can have complementary shapes. The spacing between the parts is then substantially uniform.

The first and second parts can be simply wafers placed side by side, obtained by cutting a substrate into two parts along a line. However, according to a variant, the second part can be a portion of a wafer of material, cut in the wafer of material forming the first part, in accordance with a specific pattern.

In the text that follows, reference is only made to one single first part and one single second part. It is however possible to design the structure with one first part and a plurality of second parts, mutually insulated and insulated from the first part. In particular, it is possible to cut in the wafers of material forming the first part, a plurality of portions of wafers which then form a plurality of second parts of the structure.

In accordance with the envisaged applications and in particular for the production of sensors such as, for example, an accelerometer or an actuator, the material of the wafer forming respectively the first and second parts of the structure can be chosen to be non-insulating. By non-insulating material, one understands a semi-conductor or conductor material.

By way of example, the material is chosen from among the following semi-conductor materials AsGa, Si, SiC, the following metals Au, W. Ti, Cr, Al, Fe, Ni, Mo and alloys of these metals.

Another objective of the invention is a method of producing a structure comprising a first part and at least one second part, co-planar with and electrically insulated from the first part. The method includes the following steps:

a) cut a substrate wafer in order to define in the wafer, a first and a second part, at least one portion of the substrate, called the holding portion and linking the first and second parts, being preserved at the time of cutting, b) substitution of an insulating holding joint, linking at least one portion of the first and second parts over substantially their entire thickness, at said holding portion of substrate connecting the first and second parts of substrate.

By substitution of an insulating holding joint, at said holding portion of substrate connecting the first and second parts, one understands, either the putting into place of said joint and the removal of the portion of substrate, or the transformation of the portion of holding substrate into an insulating joint.

The method of the invention can be implemented in accordance with several possibilities.

According to a first possibility, step a) comprises the formation of at least one cut in the substrate wafer, that goes right through and separates for the main part, the first and second parts. Step b) then comprises the filling of the cut with an insulating material forming the holding joint between the first and second parts, and the removal of the portion of the holding substrate linking the first and second parts.

One may consider that the cut that goes through separates, for the main part, the first and second parts of the substrate wafer when it separates these two parts over the whole of their adjacent edge(s), except for one or more portions of substrate that link the first and second parts in order to maintain the cohesion of the structure during the manufacturing process. These portions are named the holding portion.

According to an implementation variant of the method, step a) comprises the formation of at least one cut that does not go right through the wafer substrate, but which separates for the main part the first and second parts, the cut having a bottom that forms the substrate holding portion linking the first and second parts. In this case, step b) comprises the filling of the cut with an insulating material forming the joint between the first and second parts, and the removal of the bottom of the cut.

The cut is considered not to go right through when a cut bottom remains which links the first and second parts.

This cut bottom maintains the cohesion of the structure until the insulating joint is put into place.

When this joint is formed, the bottom is removed, for example by mechanical, chemical or physical thinning down of the substrate wafer.

The two possible ways of implementing the method, described above are not mutually exclusive. In effect, during the etching of the cuts, it is possible to preserve both a cut bottom and holding portions of the substrate linking the first and second parts over the whole thickness of the wafer.

After the removal of the cut bottom, and if necessary the removal of the other parts of holding substrate linking the first and second parts, the first and second parts are electrically insulated.

According to yet another variant of the method of the invention, the cutting of the wafer during step a) includes piercing it with a plurality of adjacent holes, separated by the side walls of the holes. In this case, step b) comprises the oxidation of the side walls, and, if the need arises, the bottom of the holes in order to convert them into an insulating holding joint.

In the implementation of the invention conforming to this variant, the portions of holding substrate which initially link the first and second parts after the cutting of the substrate wafer comprise the side walls separating the holes. The holding portions of substrate can equally well comprise the bottom of the holes if these are not pierced right through. These parts are not removed in the same way as the substrate portions in the implementations previously described, but are converted, by oxidation, in order to form the insulating holding joint.

Other characteristics and advantages of the invention will more clearly emerge from the description that follows, and that makes reference to the Figures in the appended drawings, which are given purely for illustrative purposes and which are non-limitative.

DESCRIPTION OF THE PREFERRED EMBODIMENTS

A first embodiment of the invention will be described making reference to FIGS. 1 to 7.

Figure 1:
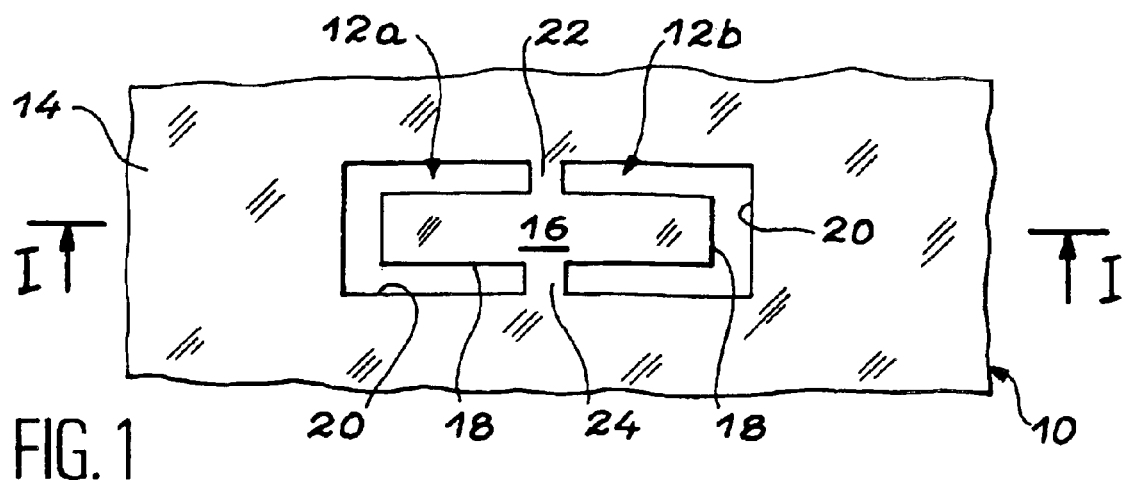
FIGS. 1 and 2 are respectively a view from above and a cross section of a wafer in which cuts going right through have been formed conforming to a first embodiment of the invention.

FIG. 1 is a view from above of a substrate wafer 10 made preferably of a non-insulating material such as, for example, a semi-conductor, a metal, or a metal alloy.

The substrate wafer can be a massive wafer or a wafer formed from several layers of different material at least one of which is preferably made of a non-insulating material.

As shown in FIG. 1, two U-shaped cuts 12*a*, 12*b* have been made in the wafer 10 which cut the wafer into a first part 14 and a second part 16.

More precisely, the cuts 12*a* and 12*b* form a spacing which separates adjacent edges of the first and second parts. These adjacent edges are designated with reference numbers 1B and 20.

It should be noted that the cuts 12*a* and 12*b* do not entirely isolate the second part 16 from the first part 14. These parts are held rigidly one from the other by two portions of substrate 22 and 24 preserved at the time of the etching of the cuts 12a and 12b. The substrate portions 22 and 24, called "bridges" have several functions. The first function is, ? indicated above, to maintain the cohesion of parts 14 and 16, and, in particular, to prevent part 16 from detaching from part 14. A further function is to hold part 14 in a fixed position, in such a way that a uniform spacing separates the adjacent edges 18 and 20. A final function is to hold the parts 14 and 16 substantially in one and the same plane.

Figure 2:
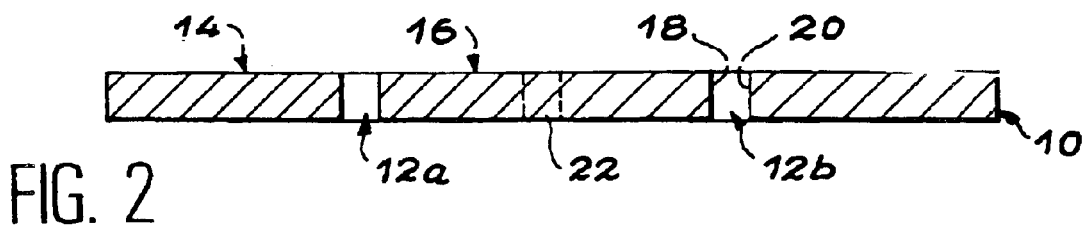

The coplanar property of parts 14 and 16 is more clearly apparent in FIG. 2 which is a cross section along the plane I—I of the wafer shown in FIG. 1.

FIG. 2 also shows that the cuts 12a and 12b are cuts that pass right through, that is to say they extend over the entire thickness of the wafer 10.

The cuts 12a and 12b can, depending on the wafer material 10, be made by dry or by wet etching, or by using an ultrasound or laser machining technique.

Present-day equipment for anisotropic deep etching allow deep cuts to be etched in the substrates. For example, it is possible to etch cuts that go right through a silicon wafer with a thickness of the order of 500 μm or more.

A second step consists of substituting the bridges 22 and 24 with another means of holding the second part 16 onto the first part 14 of the wafer. This means must be insulating.

Figure 3A:
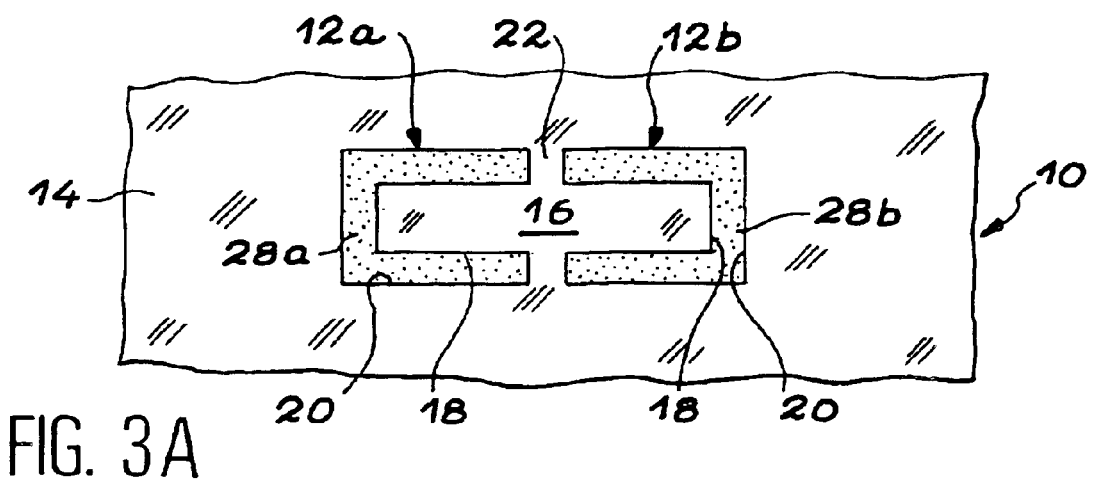
FIGS. 3A and 4 are respectively a view from above and a cross section of the structure of FIGS. 1 and 2 filled with an insulating material.

Consequently, an insulating material is placed or is formed in the cuts 12a and 12b as shown in FIG. 3A which is a view from above.

Figure 4:
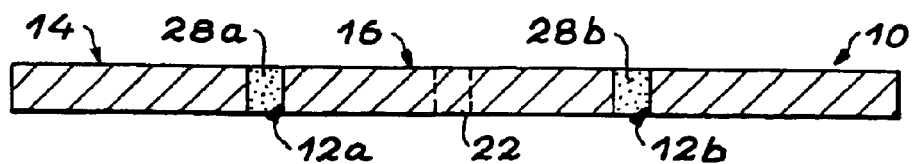

The placing of the insulating material in the cuts can comprise, for example, the deposition of a drop of insulating adhesive in the centre of the wafer 10, the positioning of a silicone foam film on the face of the wafer that includes the drop, and then putting the assembly under a press in order to force the adhesive into the cuts 12a and 12b. The adhesive is, for example, an adhesive of the Epotechni brand, type E505. The structure shown in section in FIG. 4 is thereby obtained.

The adhesive forms the insulating joints indicated by reference numbers 28a, 28b which fill the cuts 12a and 12b. It should be noted from FIG. 4 that the insulating joint 28a, 28b links the adjacent edges 18 and 20 of the parts 14 and 16 and extends over the entire thickness of these parts, the thickness being measured perpendicular to the main faces of the wafer 10.

The adhesive can be replaced by any polymer or liquid epoxy resin or liquid silica which is capable of being polymerised or dried after its introduction into the cuts 12a and 12b. The polymer or the resin are however chosen in order to be electrically insulating.

Figure 3B:
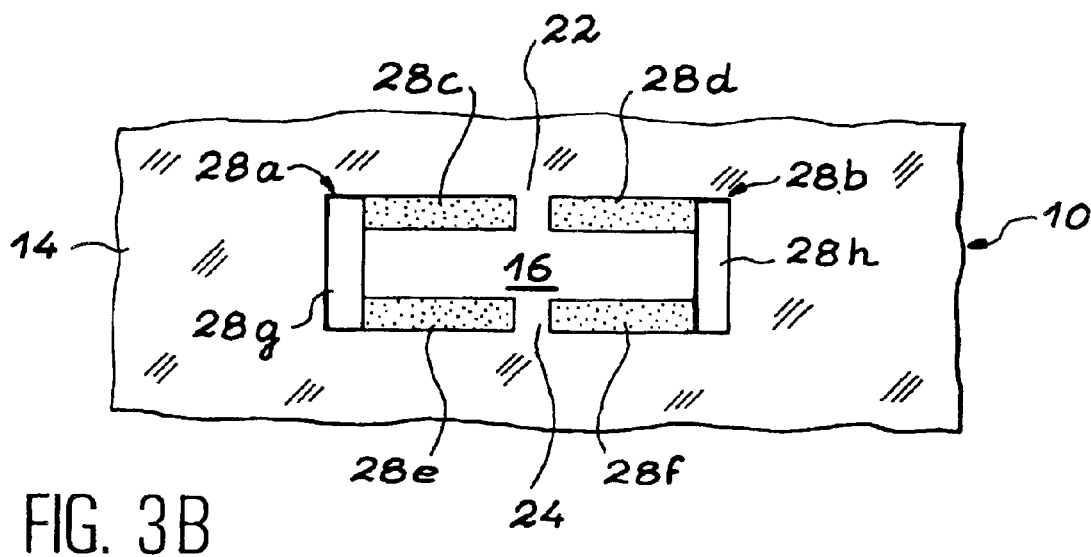
FIG. 3B is a view from above of a wafer, comparable to FIG. 3A, and illustrates a production variant.

According to a variant illustrated in FIG. 3B, the insulating joints are only created in portions of the cuts 12a and 12b, situated on the sides of the second part 16 linked to the bridges 22 and 24. The insulating joints carry reference numbers 28c, 28d, 28e and 28f. Portions 28g and 28h of the cuts 12a and 12b are left free. This arrangement allows one to limit the stress phenomena associated with volume changes (dilatation) of the insulating joint(s) during their creation or during the use of the structure.

Indeed, the variation of the volume of insulating joints located in portions 28g and 28h would be capable of causing a compressive or tensile force in the direction along the length of part 16, and could possibly constitute a problem.

Figure 5:
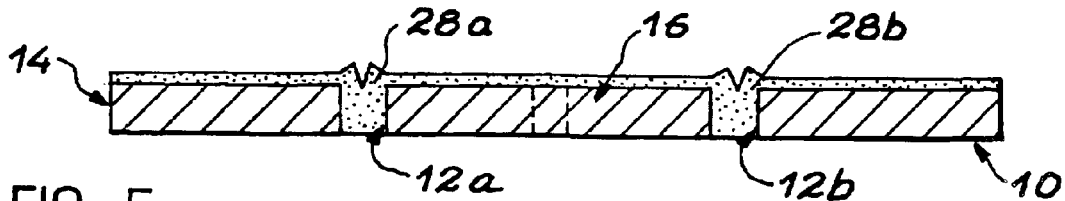
FIG. 5 is a cross section of the structure of FIGS. 1 and 2 filled with an insulating material according to another filling technique.

FIG. 5 shows in section, another method of forming the insulating joints 28a and 28b. According to this method, a layer of insulating material is formed by deposition or by crystal growth. It relates, for example, to a layer of silica or of silicon nitride. This material fills the cuts 12a and 12b where it forms the insulating holding joint and covers one of the main faces of parts 14 and 16 of the wafer 10.

After the formation of the insulating holding joint in the cuts, the production of the structure is continued by the removal of the bridges 22 and 24 which have no further use and whose holding functions have now been provided by the insulating joint(s). Bridges 22 and 24 are removed, for example, by etching, in order to obtain the structure illustrated in FIGS. 6 and 7.

According to one variant however, the bridges 22 and 24 can also be kept and converted to an insulating material by a suitable treatment, for example by thermal oxidation.

Figure 6:
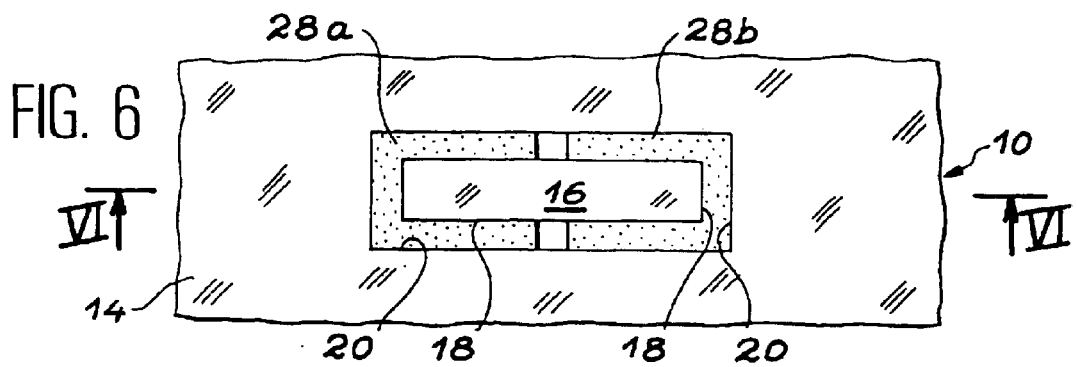
FIGS. 6 and 7 are respectively a view from above and a cross section of the structure obtained conforming to the first embodiment.
Figure 7:
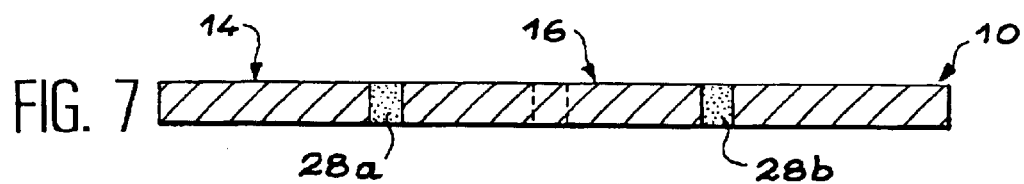

It should be noted that FIG. 7 is a section along plane VI—VI of the structure shown in FIG. 6.

After the removal (or the oxidation) of the bridges 22 and 24, there is no longer any electrical connection between the first and second parts.

As FIGS. 6 and 7 show, the structure, at present comprises a first and a second part 14, 16 each formed from a wafer of material, mutually insulated, substantially co-planar and of the same thickness. Two joints of insulating material 28a and 28b located in a spacing that separates the first and second parts make them integral. These joints are each in mechanical contact with at least a portion of each part, at their facing edges and substantially over their entire thickness.

Part 16 is thus electrically insulated from part 14. The possibility of providing a large holding joint thickness allows good quality insulation to be provided capable of being subjected to high voltages.

Furthermore, part 16 can be used as a membrane or a seismic mass that is mobile in relation to part 14. In order to produce a sensor, the adjacent edges can be cut in a suitable way so as to form, for example, the plates of a measurement capacitor.

Another embodiment of the invention is illustrated by FIGS. 8 to 11. Because of the strong similarities with the preceding Figures, identical or similar parts bear the same reference numbers. It is therefore also possible to make reference to the description given above.

Figure 8:
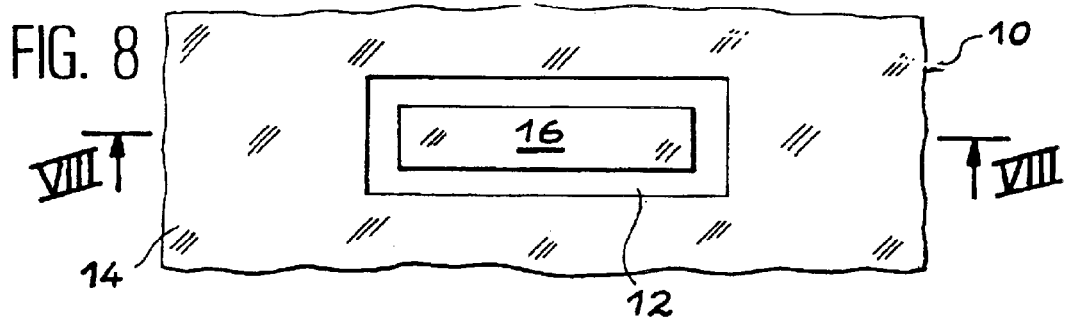
FIGS. 8 and 9 are respectively a view from above and a cross section of a wafer in which a cut has been formed conforming to a second embodiment of the invention.

FIG. 8 shows a wafer 10 in which a cut 12 has been etched which separates, within the wafer, a central part 16 and a part 14 that surrounds the part 16.

Figure 9:
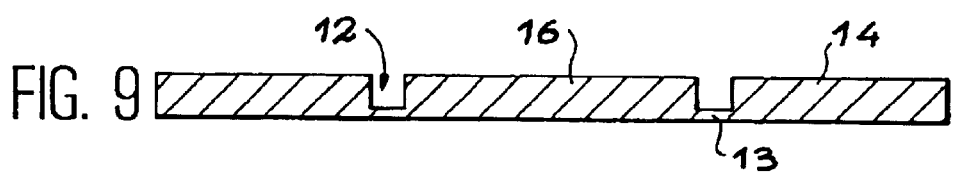

FIG. 9 which is a cross section along the plane VIII—VIII of the structure in FIG. 8 allows it to be observed that, in contrast to the cuts visible in FIG. 2, the cut 12 in the second embodiment is not a cut that goes right through. During the etching of the cut 12, which can take place using the etching techniques described above, the bottom of the cut 13 is preserved.

The bottom of the cut fulfils functions analogous to those of the bridges 22 and 24 which are visible in FIGS. 1 to 5.

In effect, the bottom of the cut 13 holds the part 16 of the wafer in a fixed position, co-planar with the part 14, and provides the mechanical cohesion of the structure.

The bottom of the cut 13 has, for example, a thickness of the order of 300 μm, for a cut 12 of a depth of the order of 500 μm.

Figure 10:
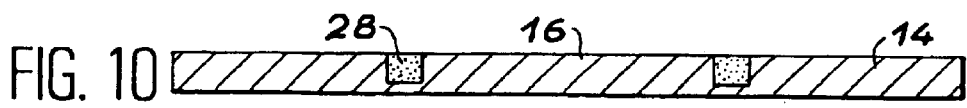
FIG. 10 is a cross section illustrating the filling of the cut in the structure of FIGS. 8 and 9.

FIG. 10 shows a step of filling cuts with an electrically insulating material so as to form an insulating holding joint 28. The joint 28 is, for example, created with a polymer, a resin, silica or silicon nitride. Placing it in the cut can take place, for example, by deposition or by pressing as described previously.

After the formation of the joint 28, the bottom of the cut 13 is removed by grinding, or by dry, wet or electrochemical etching.

Figure 11:
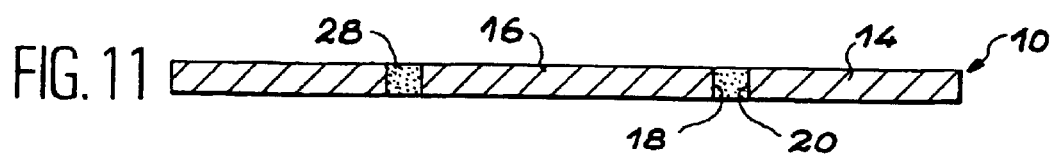
FIG. 11 is a cross section of a structure obtained conforming to the second embodiment of the invention.

The removal of the bottom of the cut is also accompanied by a thinning of parts 14 and 16 of the substrate wafer to obtain the structure represented in cross section in FIG. 11.

The joint 28 is in mechanical contact with the adjacent edges 18, 20 of the first and second parts and extends over the entire thickness of parts 14 and 16 of the wafer 10.

Finally, FIGS. 12 to 15 illustrate a third embodiment of the invention.

To facilitate the reading of the Figures, parts identical or similar to those in the preceding Figures still bear the same reference numbers.

Figure 12:
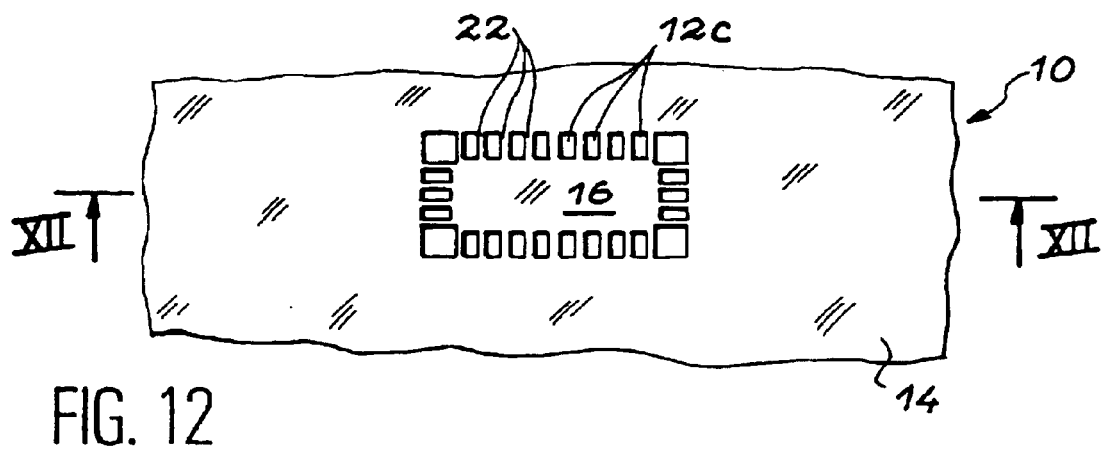
FIGS. 12 and 13 are respectively a cross section and a view from above of a wafer in which holes have been made conforming to a third embodiment of the invention.

FIG. 12 shows a silicon wafer 10 in which a first part 14 and a second part 16 have been defined. Parts 14 and 16 are defined by a group of adjacent holes 12c cut into the wafer. The holes 12c are separated two by two by the side walls 22 of the holes.

Figure 13:
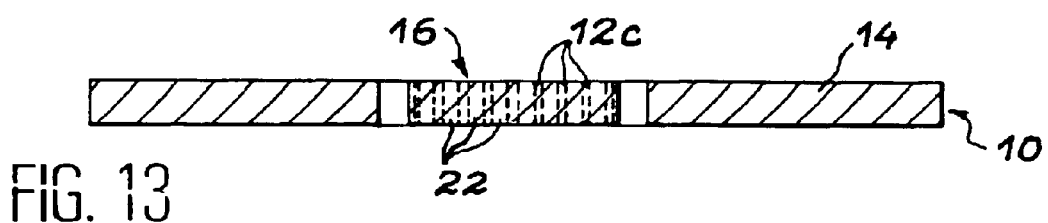

As is shown in FIG. 13, which is a section along the plane XII—XII indicated in FIG. 12, the holes 12c pass right through the wafer 10. However, it is possible, in accordance with a variant, to make holes that do not pass all the way through. In this case "hole bottoms" are left which have a thickness of a few micrometers.

The walls 22 that laterally separate the holes 12c, and similarly the "hole bottoms", play a mechanical holding role comparable to the bridges 22 and 24 (see FIGS. 1 to 5) of the first embodiment and to the bottoms of the cut 13 (see FIGS. 9 and 10) of the second embodiment.

The walls 22, in particular, allow the central part 16 to be rigidly attached to the part 14 of the wafer 10.

The portions of substrate that constitute the walls 22 and possibly the hole bottoms are not removed as in the embodiments previously described but are converted in order to make them insulating. The substitution of these portions of substrate by an insulating joint occurs here through an oxidation.

Figure 14:
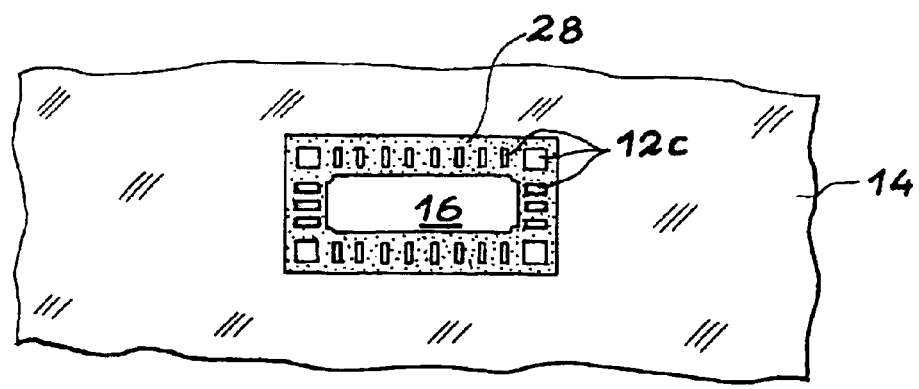
FIGS. 14 and 15 are respectively a cross section and a view from above of a structure obtained conforming to the third embodiment of the invention.
Figure 15:
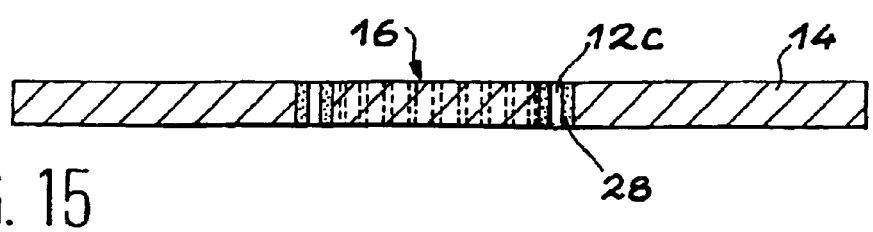

The size of the holes 12c, the thickness of the walls 22 that separate them, the thickness of the "hole bottoms" and the oxidation conditions are chosen such that the oxidation of the side walls 22 and, if the need arises, of the "hole bottoms" takes place throughout their entire thickness. The oxidation is, for example, a thermal oxidation carried out at a temperature of the order of 1050° C. These parts, converted into silicon oxide then become electrically insulating and constitute the holding joint in the sense of this invention. FIGS. 14 and 15 illustrate the structure thereby obtained. In these Figures, the oxidised parts are indicated with reference number 28.

In the Figures described above, the second part, defined in the wafer, is, for reasons of simplification, represented as a substantially rectangular shape.

However other shapes may be envisaged. In particular, the adjacent edges of the first and second parts can be configured as interdigitating combs to constitute a variable capacitor, the capacity of which is modified by relative movement of the first and second parts.

For other applications, a structure obtained that conforms to the invention also constitutes a low cost substrate with one or more parts mutually insulated.

DOCUMENTS QUOTED (1)
Novel High-Performance Pressure Sensors Using Double SOI Structures
Gwiy-Sang Chung et al;
IEEE 1991, pages 676–680

(2)
FR-A-2 700 065

(3)
Thermal Micro-actuators for Surface Micro-machining Process
by J. H. Comtois et al.
6VSIE, vol. 2642, pages 10–21

(4)
Comb Actuators for xy-microstages
by V. P. Jaecklin et al.
Sensors and Actuators A, 39 (1993), 83–89

What is claimed is:

1. A substrate structure comprising:
a first part formed in a wafer of material;
at least one second part formed on in said wafer in substantially the same plane as said first part and having a same thickness as said first part, said first and second parts having at least one set of opposing edges separated by a spacing; and
at least one joint of insulating material arranged in the spacing and mechanically joining at least a portion of said first and second parts and extending substantially over the entire thickness of said parts,
wherein said first and second parts are electrically insulated from one another, and
said joint of insulating material provides the only mechanical link between said first and second parts.

2. Structure according to claim 1, in which the opposing edges of the first and second parts are substantially contoured to each other.

3. Structure according to claim 2, in which the the first and second parts is a non-insulating material.

4. Structure according to claim 2, in which the first and second parts form respectively the fixed part and the mobile part of a sensor or of an actuator.

5. Structure according to claim 1, in which the material of the wafer forming the first and second parts is a non-insulating material.

6. Structure according to claim 5, in which the material is chosen from among the semi-conductor materials AsGa, Si, SiC, the following metals Au, W, Ti, Cr, Al, Fe, Ni, Mo and the alloys of these metals.

7. Structure according to claim 5, in which the first and second parts form respectively the fixed part and the mobile part of a sensor or of an actuator.

* * * * *

UNITED STATES PATENT AND TRADEMARK OFFICE
CERTIFICATE OF CORRECTION

PATENT NO.     : 6,833,570 B1
DATED          : December 21, 2004
INVENTOR(S)    : Brun et al.

It is certified that error appears in the above-identified patent and that said Letters Patent is hereby corrected as shown below:

Column 4,
Line 65, change "1B" to -- 18 --.

Column 8,
Line 19, change "6VSIE" to -- SPIE --.
Lines 41-42, change "the first and second parts is non-insulating material" to -- the material of the wafer forming the first and second parts is a non-insulating material --.

Signed and Sealed this

Twelfth Day of July, 2005

JON W. DUDAS
*Director of the United States Patent and Trademark Office*